United States Patent
Steinder et al.

(10) Patent No.: US 9,628,401 B2
(45) Date of Patent: *Apr. 18, 2017

(54) SOFTWARE PRODUCT INSTANCE PLACEMENT

(71) Applicant: International Business Machines Corporation, Armonk, NY (US)

(72) Inventors: Malgorzata Steinder, Leonia, NJ (US); Ian N. Whalley, Pawling, NY (US)

(73) Assignee: International Business Machines Corporation, Armonk, NY (US)

( * ) Notice: Subject to any disclaimer, the term of this patent is extended or adjusted under 35 U.S.C. 154(b) by 264 days.

This patent is subject to a terminal disclaimer.

(21) Appl. No.: 14/037,366

(22) Filed: Sep. 26, 2013

(65) Prior Publication Data

US 2014/0280965 A1    Sep. 18, 2014

Related U.S. Application Data

(63) Continuation of application No. 13/802,708, filed on Mar. 14, 2013.

(51) Int. Cl.
*H04L 12/893* (2013.01)
*H04L 12/911* (2013.01)
*G06F 9/50* (2006.01)

(52) U.S. Cl.
CPC ............ *H04L 47/70* (2013.01); *G06F 9/505* (2013.01)

(58) Field of Classification Search
CPC .... G06F 9/5066; G06F 11/1482; G06F 9/505; G06F 9/5061; G06F 9/5072; G06F 9/5083; H04L 67/1031; H04L 47/70; H04L 67/1014; H04L 67/34

See application file for complete search history.

(56) References Cited

U.S. PATENT DOCUMENTS

| 7,496,667 | B2 * | 2/2009 | Adam .................... G06F 9/505 709/223 |
| 7,743,001 | B1 | 6/2010 | Vermeulen et al. .......... 705/400 |
| 7,877,755 | B2 * | 1/2011 | Steinder .................. G06F 9/505 709/226 |
| 8,037,187 | B2 | 10/2011 | Dawson et al. ............. 709/226 |

(Continued)

OTHER PUBLICATIONS

Frank Denneman "VM to Hosts affinity rule", Oct. 1, 2012.*

(Continued)

*Primary Examiner* — Greg C Bengzon
(74) *Attorney, Agent, or Firm* — Ido Tuchman; Mercedes L. Hobson

(57) ABSTRACT

A system, method and computer program product for detecting data omissions between intermittently-connected devices. An example system includes physical computing resources available for utilization. A placement server communicates with a client. The client seeks to use a portion of the computer resources to execute the software product instances. The placement server receives resource utilization parameters from the client and assigns the portion of the computer resources to the software product instances based on the resource utilization parameters and the physical computing resources available for utilization. The resource utilization parameters include specification of a hierarchal arrangement of the software product instances.

5 Claims, 5 Drawing Sheets

(56) References Cited

U.S. PATENT DOCUMENTS

| | | | | |
|---|---|---|---|---|
| 8,214,829 B2* | 7/2012 | Neogi | G06F 1/3203 713/300 |
| 8,239,513 B1 | 8/2012 | Paleja et al. | 709/223 |
| 8,332,873 B2 | 12/2012 | Adam et al. | 719/320 |
| 8,352,608 B1* | 1/2013 | Keagy | G06F 8/63 709/220 |
| 9,218,213 B2* | 12/2015 | Steinder | G06F 9/5033 |
| 9,319,336 B2* | 4/2016 | Thakkar | H04L 47/50 |
| 9,372,735 B2* | 6/2016 | Calder | G06F 9/5077 |
| 2003/0182427 A1* | 9/2003 | Halpern | G06F 9/4843 709/226 |
| 2005/0038789 A1* | 2/2005 | Chidambaran | H04L 67/1031 |
| 2006/0288346 A1* | 12/2006 | Santos | G06F 9/4887 718/102 |
| 2007/0022426 A1* | 1/2007 | Steinder | G06F 9/505 718/104 |
| 2007/0180083 A1* | 8/2007 | Adam | G06F 9/5066 709/223 |
| 2007/0300239 A1* | 12/2007 | Adam | G06F 9/505 719/320 |
| 2008/0049254 A1* | 2/2008 | Phan | G06F 9/5033 358/1.16 |
| 2008/0095339 A1* | 4/2008 | Elliott | H04L 12/14 379/93.01 |
| 2008/0104605 A1* | 5/2008 | Steinder | G06F 9/5033 718/104 |
| 2008/0282267 A1* | 11/2008 | Adam et al. | 719/320 |
| 2009/0012963 A1* | 1/2009 | Johnson et al. | 707/10 |
| 2009/0171718 A1 | 7/2009 | Barlow et al. | 705/7 |
| 2010/0125844 A1* | 5/2010 | Mousseau | G06F 9/50 718/1 |
| 2011/0035752 A1* | 2/2011 | Krishnakumar | G06F 9/4881 718/103 |
| 2011/0099403 A1* | 4/2011 | Miyata | G06F 1/32 713/323 |
| 2011/0099553 A1* | 4/2011 | Agarwal | G06F 9/4881 718/105 |
| 2011/0154353 A1 | 6/2011 | Theroux et al. | 718/104 |
| 2011/0219372 A1* | 9/2011 | Agrawal | G06F 9/45558 718/1 |
| 2011/0225277 A1* | 9/2011 | Freimuth | G06F 9/45558 709/223 |
| 2011/0252420 A1 | 10/2011 | Tung et al. | 718/1 |
| 2011/0258634 A1 | 10/2011 | Bonilla et al. | 718/105 |
| 2011/0264805 A1 | 10/2011 | Breitgand et al. | 709/226 |
| 2011/0276674 A1* | 11/2011 | Jensen-Horne | G06F 9/5061 709/223 |
| 2012/0131591 A1* | 5/2012 | Moorthi | G06Q 10/06 718/104 |
| 2012/0159523 A1* | 6/2012 | Kulkarni et al. | 719/328 |
| 2012/0284408 A1* | 11/2012 | Dutta | G06F 9/5066 709/226 |
| 2012/0324069 A1* | 12/2012 | Nori | H04L 41/0806 709/222 |
| 2013/0145203 A1* | 6/2013 | Fawcett | G06F 9/5061 714/3 |
| 2013/0160003 A1* | 6/2013 | Mann | G06F 9/5088 718/1 |
| 2013/0227584 A1* | 8/2013 | Greene | G06F 9/5083 718/104 |
| 2013/0232463 A1* | 9/2013 | Nagaraja | G06F 8/61 717/101 |
| 2013/0238785 A1* | 9/2013 | Hawk | G06F 9/5072 709/224 |
| 2013/0246625 A1* | 9/2013 | Vendrow | G06F 8/60 709/226 |
| 2014/0082165 A1* | 3/2014 | Marr | G06F 9/5044 709/222 |
| 2014/0280951 A1* | 9/2014 | Steinder | G06F 9/505 709/226 |
| 2014/0298349 A1* | 10/2014 | Jackson | G06Q 50/06 718/104 |

OTHER PUBLICATIONS

Saboowala, "Cloud Service Placement," Cloudbook Journal vol. 2 Issue 1, 2011.

Agarwal et al., "Volley: Automated Data Placement for Geo-Distributed Cloud Services," Proceedings of the 7th USENIX conference on Networked systems design and implementation, 2010.

Sotomayor et al, "Virtual Infrastructure Management in Private and Hybrid Clouds," IEEE Internet Computing, 2009.

Elmroth et al., "Interfaces for Placement, Migration, and Monitoring of Virtual Machines in Federated Clouds," 2009 Eighth International Conference on Grid and Cooperative Computing.

Moens et al., "Design and Evaluation of a Hierarchical Application Placement Algorithm in Large Scale Clouds," 12th IFIP/IEEE International Symposium on Integrated Network Management 2011.

* cited by examiner

```
1 {
2      "version" : "1.0",
3      "encoding": "UTF-8",
4      "domain" :
5      {
6            "types": [
7                  {
8                        "id" : "ALL_PMS",
9                        "pinned" : true
10                 }
11           ],
12           "instances": [
13                 {
14                       "id" : "pm-1",
15                       "type" : "ALL_PMS",
16                       "capacities" : {"RAM": 1000, "CPU": 20000, "DAS": 40000},
17                       "hosting" : [
18                             {
19                                   "id" : "vm-1",
20                                   "demands" : {"RAM": 700, "CPU": 2000, "DAS": 100},
21                                   "state" : "STARTED",
22                                   "maxIn" : {"ALL_PMS" : 1},
23                                   "pinned" : false
24                             },
25                             {
26                                   "id" : "vm-2",
27                                   "demands" : {"RAM": 500, "CPU": 2000, "DAS": 100},
28                                   "state" : "STARTED",
29                                   "maxIn" : {"pm-1" : 1}
30                             }
31                       ]
32                 },
33                 {
34                       "id" : "pm-2",
35                       "type" : "ALL_PMS",
36                       "capacities" : {"RAM": 2000, "CPU": 10000, "DAS" : 400}
37                 }
38           ]
39     }
40 }
```

*Fig. 2*

```
1  {
2      "version" : "1.0",
3      "encoding" : "UTF-8",
4      "domain" :
5      {
6          "types": [
7              {
8                  "id" : "ALL_PMS",
9                  "pinned" : true
10             },
11             {
12                 "id" : "VMtypeA",
13                 "demands" : {"RAM": 500, "CPU": 2000},
14                 "minOverall" : 0,
15                 "maxOverall" : 99999,
16                 "pinned" : true
17             },
18             {
19                 "id" : "ClusterA",
20                 "demands" : {"RAM": 500, "CPU" : 30000},
21                 "maxIn" : {"VMtypeA" : 99999},
22                 "maxAbove" : {"ALL_PMS" : 99999},
23                 "minOverall" : 0,
24                 "maxOverall" : 3
25             }
26         ],
27         "instances": [
28             {
29                 "id" : "pm-1",
30                 "type" : "ALL_PMS",
31                 "capacities" : {"RAM": 1000, "CPU": 2000, "DAS": 40000},
32                 "hosting" : [
33                     {
34                         "id" : "vm-1",
35                         "type" : "VMtypeA",
36                         "demands" : {"RAM": 500, "CPU": 10, "DAS": 100},
37                         "state" : "STARTED",
38                         "maxIn" : {"ALL_PMS" : 9999},
39                         "pinned" : true,
40                         "hosting" : [
41                             {
42                                 "id" : "ClusterA-1",
43                                 "type" : "ClusterA",
44                                 "state" : "STARTED",
45                                 "demands" : {"RAM": 200}
46                             }
47                         ]
48                     }
49                 ]
```

*Fig. 3A*

```
50          },
51          {
52                  "id" : "pm-2",
53                  "type" : "ALL_PMS",
54                  "capacities" : {"RAM": 2000, "CPU": 1000},
55                  "hosting" : [
56                  {
57                          "id" : "vm-2",
58                          "type" : "VMtypeA",
59                          "demands" : {"RAM": 500, "CPU": 0},
60                          "state" : "STARTED",
61                          "maxIn" : {"ALL_PMS" : 99999}
62                  }
63                  ]
64          }
65          ]
66  }
67 }
```

*Fig. 3B*

SOFTWARE PRODUCT INSTANCE PLACEMENT

CROSS-REFERENCE TO RELATED APPLICATIONS

This application claims priority under 35 U.S.C. §120 to U.S. patent application Ser. No. 13/802,708 filed Mar. 14, 2013, the entire text of which is specifically incorporated by reference herein.

BACKGROUND

The present invention relates to executing software products. More particularly, the present invention relates to managing placement of software product instances on computing resources.

Many modern software products and computing infrastructures incorporate some level of self-management: that is to say, they are able to react to changes in the extant workload (the work that needs to be done), the configuration, and the properties of the system upon which they are hosted. This level of self-awareness makes good sense: human administration costs are high, and in the modern world, some of the lower level drudgery that is a fundamental part of system administration can be automated away.

One important aspect of self-management of software and infrastructures is often referred to as "placement". Placement is generally determining what software instance to execute where and when. For example, in the case of an Infrastructure as a Service cloud, placement would refer (amongst other things) to determining where (upon which physical machine) to run a new virtual machine in response to a provisioning request from an end-user. In the case of a clustered application server middleware software product, on the other hand, placement might refer to determining which application servers to start, and which to stop, as the incoming web workload fluctuates. In yet another case, a distributed database might use a placement component to determine how to distribute chunks of data across the various instances of the database, and how to distribute instances of the database across the available machines.

SUMMARY

An aspect of the present invention is a system for managing software product instance placement. The system includes a plurality of physical computing resources available for utilization. A placement server communicates with a client. The client seeks to use a portion of the computer resources to execute the software product instances. The placement server is configured to receive resource utilization parameters from the client and assign the portion of the computer resources to the software product instances based on the resource utilization parameters and the physical computing resources available for utilization. The resource utilization parameters include specification of a hierarchal arrangement of the software product instances.

Another aspect of the present invention is a method for managing software product instance placement on a plurality of physical computer resources. The method includes receiving by a placement service resource utilization parameters from a client. The resource utilization parameters include specification of a hierarchal arrangement of software product instances. An assigning operation assigns a portion of the computer resources to the software product instances based on the resource utilization parameters and the physical computing resources available for utilization.

Yet another example aspect of the invention is a computer program product for managing software product instance placement on a plurality of physical computer resources. The computer program product includes computer readable program code configured to receive by a placement service resource utilization parameters from a client and assign a portion of the computer resources to the software product instances based on the resource utilization parameters and the physical computing resources available for utilization.

BRIEF DESCRIPTION OF THE DRAWINGS

FIG. 2 shows an example document in JSON format containing the utilization parameters.

FIGS. 3A and 3B show another example Placement as a Service input from a client, in accordance with one embodiment of the present invention.

DETAILED DESCRIPTION

The present invention is described with reference to embodiments of the invention, but shall not be limited to the referenced embodiments. Throughout the description of the present invention, references are made to FIGS. 1 through 4.

Figure 1:
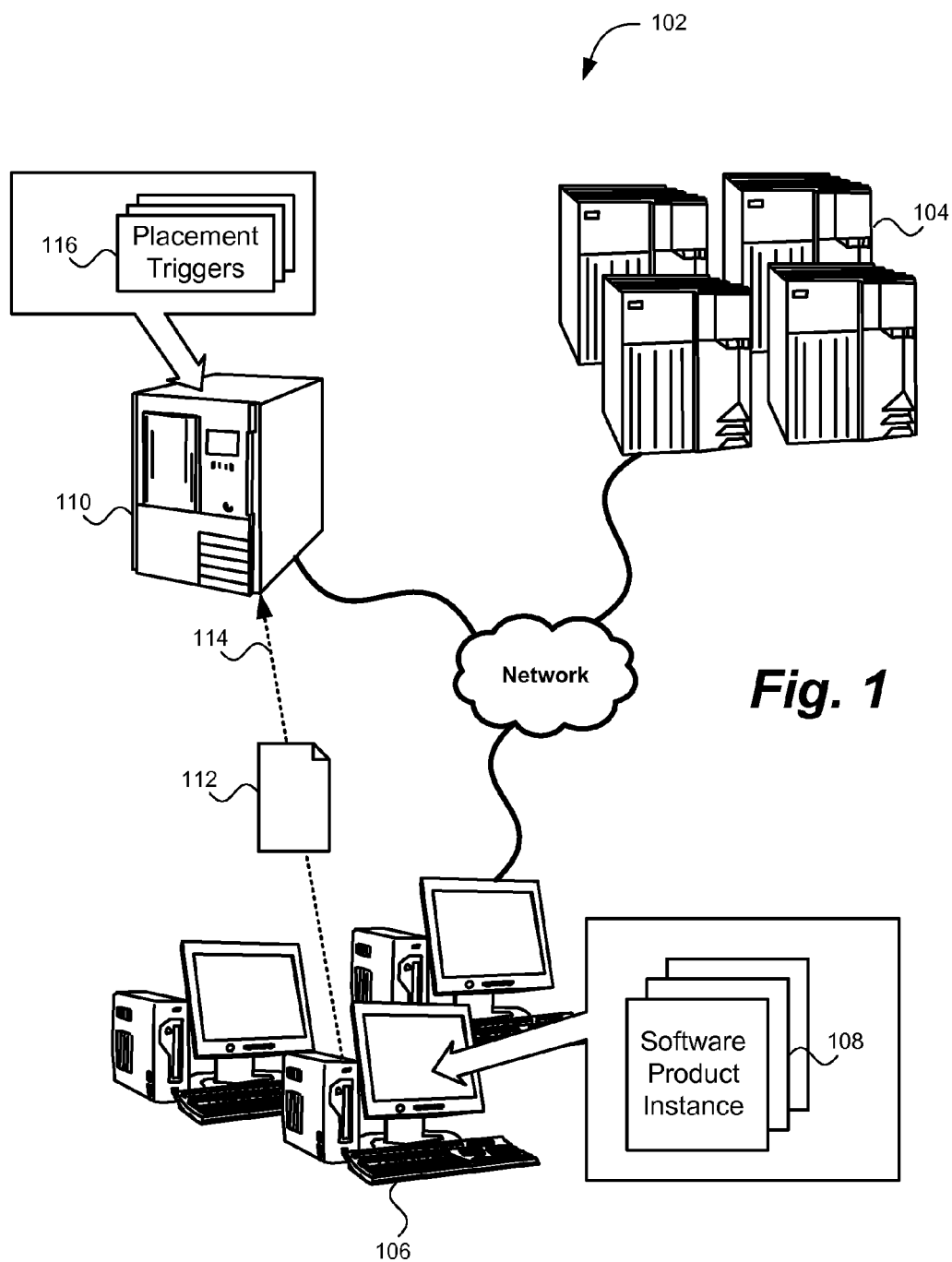
FIG. 1 shows an example system for managing software product instance placement as contemplated by the present invention.

FIG. 1 shows an example system 102 for managing software product instance placement as contemplated by the present invention.

The system 102 includes physical computing resources 104 available for utilization. The system also includes a client 106 seeking to use a portion of the computer resources 104 to execute software product instances 108. In one embodiment, the client 106 is a member of a plurality of clients.

A placement server 110 is in communication with the client 106 is configured to receive resource utilization parameters 112 from the client. As discussed in detail below, resource utilization parameters including specification of a hierarchal arrangement of the software product instances 108. The placement server 110 is further configured to assign a portion of the computer resources 104 to the software product instances 108 based on the resource utilization parameters 112 and the computing resources 104 available for utilization.

In one embodiment, the placement server 110 is stateless. Thus, the portion of the computer resources assigned to the software product instances 108 is based solely on the resource utilization parameters 112 and the computing resources 104 available for utilization. In another embodiment, the placement server is stateful. In this configuration, the portion of the computer resources 104 assigned to the software product instances is further based, for example, on computer resource assignments to other clients.

In one embodiment, the system 102 includes a communication port 114 at the placement server to receive the utilization parameters 112 in a standardized form. The standardized form may include, for example, classes to group the resource utilization parameters.

In one embodiment, the placement server 110 includes placement triggers 116 configured to initiate an assignment of the portion of the plurality of physical computer resources to the software product instances based on a predetermined condition. For example, the predetermined condition may be a time interval.

Accordingly, placement server 110 can be shared, at runtime, between various software systems and various infrastructures. That is to say, a Placement as a Service (PlaaS) is provided.

At a high level, there are two ways in which PlaaS can be provided. The first such embodiment is one in which the PlaaS exists as a true service: software that is available for use by other systems. In this embodiment, PlaaS exposes a well-known interface, which is sufficiently generic for a wide variety of client systems, by which it can be invoked. A second embodiment is one in which the PlaaS exists as a shared software component, which client systems can embed directly. In both embodiments, the interface between the client system and the PlaaS can be standardized, and can be shared.

In the case of a shared PlaaS, additional systemic improvements can be obtained if the same PlaaS instance is used by multiple client systems that are sharing an underlying infrastructure. In addition, yet further improvements can be obtained if that same infrastructure uses the PlaaS as well. For example, if an Infrastructure as a Service cloud uses a given PlaaS instance to decide where to start requested virtual machines, and the middleware in those virtual machines uses that same PlaaS instance to determine whether it requires additional resources, then that PlaaS instance can use knowledge that the middleware does not have in order to make a better decision on behalf of the middleware. One driving example of such knowledge is the mapping of virtual machines to physical machines, which the middleware does not typically have in such a system. If the Infrastructure as a Service cloud is using the PlaaS to make deployment decisions, then the PlaaS has that mapping information, and can use it to make better decisions on behalf of the middleware that is also using the PlaaS.

A variety of mechanisms by which such a shared software component can be provided are contemplated by the present invention. For example, such a service can offer either a network interface or an in-process interface. In the case of a network interface, the communication can be carried out by exchanging JSON documents over HTTP, or making SOAP calls, or by making traditional RPC invocations, or via message-oriented middleware such as IBM MQ or RabbitMQ. In the case of an in-process interface, normal direct invocation will typically be sufficient.

FIG. 2 shows an example document in JSON format containing the utilization parameters 112. The listing is an example PlaaS input from a client that is an Infrastructure as a Service provider. The example is kept small, for the sake of clarity. It shows a system containing two physical machines (pm-1 and pm-2). The first of those (pm-1) is hosting two virtual machines (vm-1 and vm-2). Below are some aspects of this sample input:

1. Instances in the problem specification optionally have 'types': for example, here we see that a type ALL_PMS is defined (lines 6-11), and that both physical machine instances (pm-1 and pm-2) are of this type (lines 15 and 35). Instance properties are inherited from the type, unless overridden by the instance.

2. The virtual machines have different sets of demands (lines 20 and 27). Similarly, the physical machines have different capacities (lines 16 and 36).

3. The virtual machines also have different rules on where they are permitted to execute. For example, vm-1 can run on anything of type ALL_PMS (line 22), but vm-2 can only run on pm-1 (line 29).

4. vm-1 is not 'pinned' (line 23). When an instance is 'pinned', it cannot be moved: this PlaaS pins everything by default. vm-1, therefore, is explicitly not pinned, permitting the PlaaS to consider moving it.

FIGS. 3A and 3B show another example PlaaS input from a client. In this case, the client is a clustered middleware system.

It can be seen that this PlaaS input is somewhat more complex than the preceding example: there are more types, and deeper hosting stacks. We see that the input describes physical machines, virtual machines, and a cluster: in this case, that cluster is an application server cluster, although that fact is not reflected in the input (nor does it need to be).

The input in question shows a single middleware cluster (ClusterA, defined at lines 19-24). There is a single instance of that cluster currently placed (ClusterA-1, shown at lines 42-45). This instance is executing within a virtual machine (vm-1), which in turn executes within a physical machine (pm-1).

The cluster is permitted to run in any virtual machine of type VMtypeA—this can be seen in the type definition, specifically at line 21. Instance vm-1 is of this type (line 35).

Another instance of VMtypeA is vm-2 (lines 57-61), which is running on pm-2. Clearly one option available to the PlaaS in this case would be to start a second instance of the cluster inside vm-2.

It is emphasized that the PlaaS does not know that the virtual machines in the examples shown are Virtual Machines. It only needs to know that they are singletons, and that they have certain requirements and constraints. Similarly, the PlaaS does not know that the middleware cluster is a middleware cluster: it knows, again, only requirements and constraints.

Figure 4:
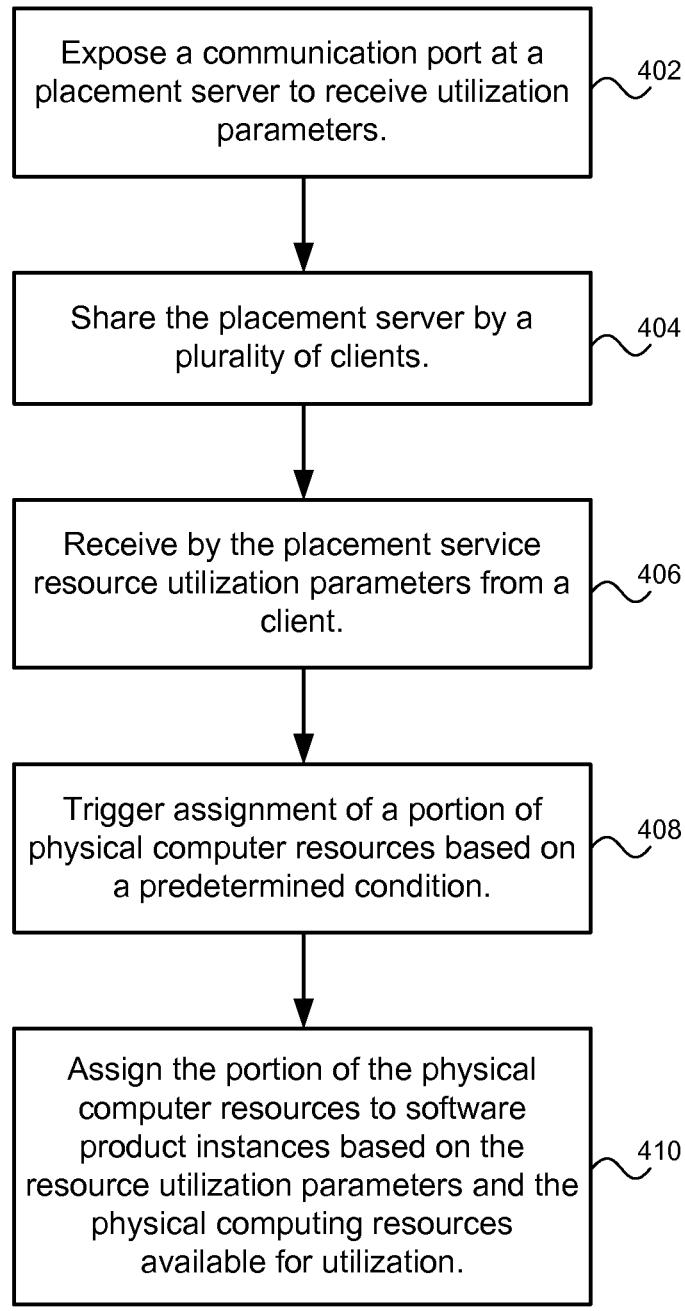
FIG. 4 shows an example process for managing software product instance placement on a plurality of physical computer resources contemplated by the present invention.

FIG. 4 shows an example process for managing software product instance placement on a plurality of physical computer resources contemplated by the present invention. The process includes exposing operation 402. During this step, a communication port is exposed at a placement server. The communication port is configured to receive the utilization parameters in a standardized form. As discussed above, the standardized form may include classes to group the resource utilization parameters. After exposing step 402 is completed, the process continues to sharing step 404.

During sharing step 404, the placement server is shared by a plurality of clients. Thus, a client of the placement server may be a member of the plurality of clients. After sharing step 402, the process continues to receiving step 406.

At receiving step 406, the placement service resource receives utilization parameters from the client. As discussed above, the resource utilization parameters include specification of a hierarchal arrangement of software product instances. After receiving step 406, the process continues to triggering step 408.

At triggering step 408, assignment of a portion of physical computer resources is triggered based on a predetermined condition. In one embodiment, the predetermined condition is a time interval. After triggering step 408, the process continues to assigning step 410.

During assigning step 410, a portion of the physical computer resources is assigned to the software product instances based on the resource utilization parameters and the physical computing resources available for utilization. In one embodiment, assigning the portion of physical computer resources to the software product instances is stateless. Thus, the portion of the physical computer resources assigned to the software product instances is based solely on the resource utilization parameters and the physical computing resources available for utilization. In another embodiment, assigning the portion of physical computer resources to the software product instances is stateful. In this configuration, the portion of the computer resources assigned to the software product instances may be further based on computer resource assignments to other clients.

Thus, in accordance with one embodiment of the invention, the PlaaS is entirely stateless and reactive to clients. Upon receiving a request from a client system, it considers the presented input, arrives at a decision, and returns output to the client representing that decision. In this embodiment, the PlaaS can be a long-running network service accessed remotely, a short-lived local processed invoked by the client, or even a code library embedded directly into the client.

In another embodiment, the PlaaS is more stateful. It can remember information provided to it by a given client, thus permitting that client to provide only subsets of that information in future requests. In most versions of this embodiment, the client will be providing changed information to the PlaaS, which the PlaaS then merges with its existing information prior to making decisions.

In yet another embodiment, instead of the client explicitly asking for a decision to be made, the client instead provides 'triggers' to the PlaaS. These triggers, when executed, tell the PlaaS whether or not to make a decision at the current time. Once triggers have been provided by the client to the PlaaS, the client pushes change information about its environment to the PlaaS as those changes occur. The PlaaS executes the triggers, usually when changes arrive, but optionally also on a timed basis, to determine whether or not to make a decision on behalf of that client.

When one or more triggers indicate that a decision should be made, the PlaaS runs a decision cycle and provides the output to the client. It can be observed that in this embodiment, the PlaaS needs to be able to initiate communicate with the client, whereas in the preceding two, the client initiates communications. Consequently, this requires greater effort on the part of the client.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing software product instance placement on a plurality of physical computer resources, the method comprising:

receiving by a placement server utilization parameters from a client, the client is a clustered middleware system, the resource utilization parameters including a specification of a hierarchal arrangement of software product instances, the specification including specification of: capacities of the physical computing resources, resource demands of virtual machines, which type of the physical computing resources the virtual machines are permitted to execute on, and whether the virtual machines are permitted to move to a different physical computing resource;

assigning the portion of the plurality of physical computer resources to the software product instances based on the resource utilization parameters and the physical computing resources available for utilization;

exposing a communication port at the placement server, the communication port configured to receive the utilization parameters in a standardized form, the utilization parameters specifying whether virtual machine instances can be moved from one physical computer to another physical computer; and wherein assigning the portion of the plurality of physical computer resources to the software product instances is stateful, such that the portion of the plurality of physical computer resources assigned to the software product instances is further based on computer resource assignments to other clients;

wherein the placement server is shared by multiple clients in a cloud infrastructure;

wherein the plurality of software product instances is the virtual machine instances; and wherein the plurality of physical computing resources is host computers for hosting the virtual machine instances; and wherein assigning the portion of the plurality of physical computer resources to the software product instances includes assigning one of the virtual machine instances to one of the host computers based, in part, on other virtual machines instances assignments to the host computers.

2. The method of claim 1, wherein the standardized form includes classes to group the resource utilization parameters.

3. The method of claim 1, further comprising sharing the placement server by a plurality of clients, wherein the client is a member of the plurality of clients.

4. The method of claim 1, further comprising triggering assignment of the portion of the plurality of physical computer resources based on a predetermined condition.

5. The method of claim 4, wherein the predetermined condition is a time interval.

* * * * *